Oct. 10, 1967     L. SCHIKARSKI ET AL     3,346,346
METHOD FOR MELTING URANIUM OXIDE AND PLUTONIUM OXIDE
Filed Feb. 4, 1966
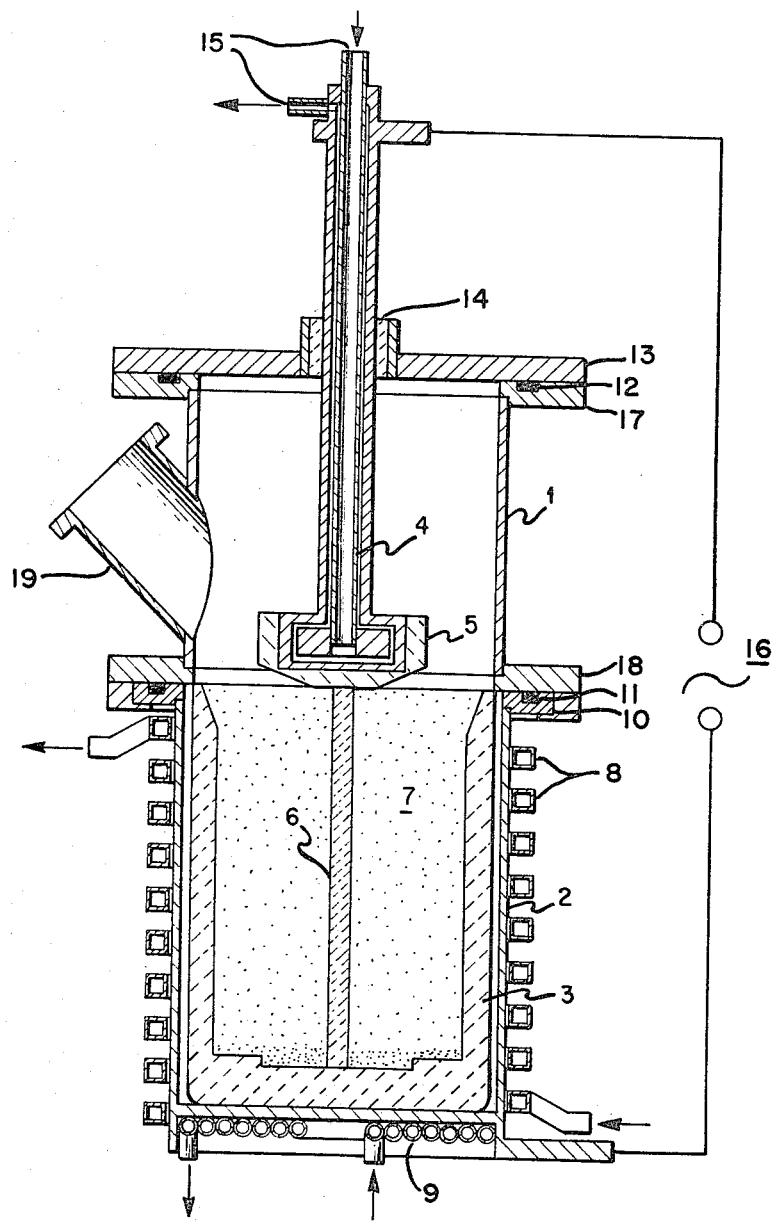
INVENTORS
*LOTHAR SCHIKARSKI*
BY *HANS-JURGEN TEIWES*
ATTORNEY.

United States Patent Office
3,346,346
Patented Oct. 10, 1967

3,346,346
METHOD FOR MELTING URANIUM OXIDE AND PLUTONIUM OXIDE
Lothar Schikarski, Hanau am Main, and Hans-Jürgen Teiwes, Ruckingen, Germany, assignors to the United States of America as represented by the United States Atomic Energy Commission
Filed Feb. 4, 1966, Ser. No. 525,807
4 Claims. (Cl. 23—344)

ABSTRACT OF THE DISCLOSURE

A process for melting a charge of fine oxide powders of plutonium oxide, uranium oxide or mixtures thereof, which comprises placing in the center of a vacuum tight crucible a preheating column of relatively conductive material such as graphite, compacts of the powder to be melted or a residue of previous melting, surrounding this column with the powder charge, contacting the column with a heating electrode, energizing said heating electrode to create a vertical path of current in the column axially of the powder charge, maintaining the current until an electrically conductive column is created in the oxide powder charge, removing the column if of a material different from the powder charge, increasing the electrical current and maintaining this current until a substantial part of the powder charge is fused substantially free of vaporization.

---

The present invention relates to a process for melting finely divided oxides. More particularly this invention relates to an improved process and apparatus for melting uranium oxide and plutonium oxide.

Generally the fabrication of the granular uranium oxide and plutonium oxide used in nuclear techniques occurs in most cases by melting the preliminary product, usually in the form of very fine powder, in an arc. The melting in an arc entails the disadvantage that a vaporization of the oxide occurs during the melting process, as the arc temperature is considerably higher than the melting point of the uranium and plutonium oxide and may be greater than the vaporization temperature of the oxides.

An object of the invention is to efficiently melt uranium oxide, plutonium oxide or mixtures thereof without vaporization of the oxide or oxides.

Another object of the invention is to provide an improved method of melting uranium oxide, plutonium oxide and mixtures thereof whereby a stoichiometric product is easily obtained.

Other objects of the invention will appear hereinafter.

It has now been found that the execution of the melting process of the very fine oxide powder can be appreciably improved by melting the oxide powder is a crucible by the direct passage of current whereby in the first phase of the process a vertical path of the current is created in the center of the oxide powder charge by preheating this zone in the first phase of the melt. By means of the preheating of the central zone it is ensured that a good passage of current occurs, first of all in the center, in the material which is a poor conductor at room temperature. By increasing and continuing the current in the second phase, the softening and melting of substantially the entire oxide powder charge occurs.

In the process according to the invention, overheating of the softened and melted oxide material is prevented so that a vaporization thereof does not in practice occur. Further, in comparison with previous methods it is comparatively easy to obtain a stoichiometric melting point by means of introducing hydrogen during the melting.

The preparation of a preheated zone in the center of the charge in the melting of uranium oxide, plutonium oxide and mixtures thereof can occur in the following ways:

Example I

A column of uranium oxide powder compacts which is very small by comparison with the crucible diameter and the electrode diameter, made of the material to be melted, is placed in the center of the crucible and surrounded with a fine uranium oxide powder filling. The column of compacts protrudes somewhat above the fine oxide powder filling, so that at the commencement of the melting the electrode rests only on this column and does not touch the powder filling. As the current is applied to this column, the column is heated by the passage of current and thus heats the surrounding fine oxide powder material. In the subsequent stage of the process, substantially the entire oxide powder charge is melted without vaporization of the oxide as its conductivity also increases with the increase of temperature.

Example II

Instead of the compact column as illustrated in Example I, the conducting bridge necessary for the heating is created in the center of the fine plutonium oxide powder filling between the electrodes by means of plutonium oxide powder filling which has a considerably better electric conductivity than the majority of the oxide powder filling. Such oxide powder filling having a considerably better electric conductivity is obtained from melt residues of previous meltings.

Example III

For the heating of the central zone, a rod is used made from material suitable for heating in direct passage of current. Such rods can be made of graphite and tungsten, for example.

After the heating rod has heated for a comparatively short time the surrounding oxide powder, which e.g. is a mixture of 75 mol percent of uranium dioxide and 15 mol percent of plutonium dioxide, the rod is removed from the oxide powder filling and the electrode is placed directly on the oxide powder filling heated in the center, which now possesses sufficient conductivity and the current is increased and the heating continues until substantially the entire charge is melted substantially free of vaporization. The heating may be conducted under a hydrogen atmosphere.

The drawing shows in cross section a design of an apparatus suitable for the execution of the method in accordance with this invention. Beneath a vacuum tight furnace lid 1 is a furnace body 2, preferably of copper. Inside this furnace body, which is cooled by side pipes 8 and bottom pipes 9 through which water flows, is a crucible 3 of a temperature resistant, electrically conducting material such as graphite. In the center of the lid an electrode holder 4 is placed. The electrode holder is movable, and water cooled by coolant passages 15 and is insulated from the lid by an electrical insulating bushing 14 which is vacuum tight. The electrode holder has at its lower end an electrode 5, preferably of graphite. A preheating column 6 is placed axially in the crucible charge 7 making electrical contact between the electrode 5 and the crucible 3. The preheating column may be made of a high temperature electrical conducting material, for example graphite or tungsten; or of an electrically conducting material made by compressing compacts of the charge material; or of a rod made by melting residues of previous charges of the charge material; or of other suitable conducting materials. The crucible 7 which consists of the powdery form of the oxide to be melted fills the balance of the crucible either to the bottom face of the electrode or to a slight distance below the bottom face of the electrode. Spacing of the charge surface below the electrode prevents premature heating of the charge and consequent vaporization of the fine oxide powder of which it is composed. The furnace lid 1, which includes the lid top 13, upper flange 17, lower flange 18, upper seal 12, and a lower seal 11 set in a sealing ring 10, is vacuum tight. A vacuum outlet 19 is provided for evacuating the furnace. It may also be used to introduce into the furnace an inert atmosphere or a reducing atmosphere such as hydrogen. A source of electrical current 16 is connected to the electrode 5 through the electrode holder 4 and to the crucible 3 through the furnace body 2. The electrical current passes through the preheating column 6 causing the charged material adjacent to the column to coalesce into a conductive state. After a sufficient amount of material surrounding the preheating rod has been heated so as to become electrically conducting, the preheating column, if it is a foreign material, may be removed, completing the preheating or first phase of the operation. In the second phase of the operation the current may be raised and the heating continued until the material in the crucible has become molten and the melt is completed. The resulting melt can be utilized for production of a granular end product by conventional methods.

The process according to the invention is useful for providing an improved process for melting uranium oxide, plutonium oxide or mixtures thereof that yields an easily stoichiometrically controlled product which is mandatory in the making of versatile nuclear fuel.

Many equivalent modifications of the above will be apparent to those skilled in the art without a departure from the inventive concept as encompassed by the following claims.

We claim:

1. A process for melting a fine oxide powder charge which comprises placing in the center of a vacuum tight crucible a preheating column of relatively conductive material surrounded by a fine oxide powder charge of the group consisting of plutonium oxide, uranium oxide and mixtures of plutonium and uranium oxides, contacting the upper end of said column with a heating electrode, energizing said heating electrode whereby a vertical path of current is created through the preheating conductive column axially in the oxide powder charge, maintaining said current until an electrically conductive column is created in the oxide powder charge, increasing the electrical current and maintaining the heating until a substantial part of the oxide powder charge is fused substantially free of vaporization.

2. A process according to claim 1 wherein the preheating conductive column is compacts of the oxide powder.

3. A process according to claim 1 wherein the preheating conductive column is residues of previous meltings.

4. A process according to claim 1 wherein the preheating conductive column is graphite, which is removed after the electrically conductive column is created in the oxide powder charge.

References Cited

UNITED STATES PATENTS

| 3,301,640 | 1/1967 | Turbett | 23—355 |
| 3,317,284 | 5/1967 | Scott et al. | 23—355 |

OTHER REFERENCES

Journal of the American Chemical Society, vol. 36, No. 12, December 1953, pp. 397–399.

CARL D. QUARFORTH, *Primary Examiner.*

R. L. GRUDZIECKI, *Assistant Examiner.*